United States Patent
Wang et al.

(10) Patent No.: US 10,223,924 B2
(45) Date of Patent: Mar. 5, 2019

(54) METHODS AND DEVICES FOR CONTROLLING UNMANNED AERIAL VEHICLE

(71) Applicant: Beijing Xiaomi Mobile Software Co., Ltd., Haidian District, Beijing (CN)

(72) Inventors: Weizhao Wang, Beijing (CN); Yan Xie, Beijing (CN); Yueyue Chu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 36 days.

(21) Appl. No.: 15/459,837

(22) Filed: Mar. 15, 2017

(65) Prior Publication Data
US 2017/0345319 A1 Nov. 30, 2017

(30) Foreign Application Priority Data

May 24, 2016 (CN) .......................... 2016 1 0348845

(51) Int. Cl.
*G08G 5/00* (2006.01)
*B64C 13/16* (2006.01)
(Continued)

(52) U.S. Cl.
CPC ........... *G08G 5/0069* (2013.01); *B64C 13/16* (2013.01); *B64C 39/024* (2013.01); *G05D 1/102* (2013.01);
(Continued)

(58) Field of Classification Search
CPC ............................ G08G 7/0069; B64C 39/024
See application file for complete search history.

(56) References Cited

U.S. PATENT DOCUMENTS 8,000,847 B2 * 8/2011 Shue .................... G05D 1/0623
244/181
8,170,730 B2 5/2012 Shue
(Continued)

FOREIGN PATENT DOCUMENTS

CN 101667036 A 3/2010
CN 102163060 A 8/2011
(Continued)

OTHER PUBLICATIONS

International Search Report and Written Opinion issued in corresponding International Application No. PCT/CN2016/098332, dated Feb. 15, 2017, 13 pages.
(Continued)

Primary Examiner — Alex C Dunn
(74) Attorney, Agent, or Firm — Arch & Lake LLP

(57) ABSTRACT

Methods and devices are provided for controlling an unmanned aerial vehicle. The method includes: obtaining meteorological data in a current location of the UAV when the UAV is in a first flight state, where the first flight state may represent a steady flight state or a take-off preparing state of the UAV; determining a flight hazard level of the UAV based on the meteorological data, where the flight hazard level may represent a hazard level caused to a flight of the UAV by weather; and controlling the UAV to switch to a second flight state when the flight hazard level is a first preset level, where the first preset level may represent a level where the UAV cannot fly safely and the second flight state being used to represent an emergency flight state or a take-off suspended state of the UAV.

17 Claims, 5 Drawing Sheets

(51) Int. Cl.
*G05D 1/10* (2006.01)
*B64C 39/02* (2006.01)

(52) U.S. Cl.
CPC ......... *G08G 5/0039* (2013.01); *G08G 5/0091* (2013.01); *B64C 2201/125* (2013.01); *B64C 2201/141* (2013.01)

(56) References Cited

U.S. PATENT DOCUMENTS

| | | | |
|---|---|---|---|
| 9,097,529 | B2 | 8/2015 | Shehi et al. |
| 2008/0046137 | A1 | 2/2008 | Shue |
| 2011/0282523 | A1 | 11/2011 | Shue |
| 2014/0019038 | A1 | 1/2014 | Shehi et al. |
| 2015/0339930 | A1* | 11/2015 | McCann ............... G08G 5/0039 701/528 |
| 2016/0225263 | A1* | 8/2016 | Salentiny ............... G08G 5/003 |
| 2016/0307447 | A1* | 10/2016 | Johnson ............... G05D 1/0044 |
| 2017/0225801 | A1* | 8/2017 | Bennett ............... B64F 1/222 |
| 2017/0291705 | A1* | 10/2017 | Wang ............... B64C 27/08 |
| 2018/0025434 | A1* | 1/2018 | Hertz ............... G06Q 40/08 |
| 2018/0090016 | A1* | 3/2018 | Nishi ............... G08G 5/0039 |

FOREIGN PATENT DOCUMENTS

| | | |
|---|---|---|
| CN | 103543749 A | 1/2014 |
| CN | 104981745 A | 10/2015 |
| CN | 104981748 A | 10/2015 |
| CN | 105005316 A | 10/2015 |

OTHER PUBLICATIONS

First Office Action (including English translation) issued in corresponding Chinese Patent Application No. 201610348845.9, dated May 4, 2017, 22 pages.

* cited by examiner

METHODS AND DEVICES FOR CONTROLLING UNMANNED AERIAL VEHICLE

CROSS-REFERENCE TO RELATED APPLICATION

This application is based on and claims priority to Chinese Patent Application No. 201610348845.9, filed on May 24, 2016, the entire contents of which are incorporated herein by reference.

FIELD

The present disclosure relates to a technical field of flight vehicles, and more particularly, to methods and devices for controlling an unmanned aerial vehicle (UAV).

BACKGROUND

An unmanned aerial vehicle, called a drone for short, is an aircraft without a human pilot aboard and operated by a radio remote control device and its own program control unit, and is widely used in fields of scientific exploration and hazard monitoring.

In the related art, if a flight path of the drone has been set before it executes a flight mission, the drone cannot return timely in case of emergency (for example, encountering dangerous weather) during the flight, and can only return or emergency-land under manual operations, which increases emergency response time of the drone; moreover, if the drone fails to return or land, the dangerous weather may cause physical damage to the drone.

SUMMARY

Embodiments of the present disclosure provide a method and device for controlling an unmanned aerial vehicle, to solve the defects in the related art.

According to a first aspect of the present disclosure, there is provided a method for controlling an unmanned aerial vehicle. The method includes: obtaining meteorological data in a current location of the UAV when the UAV is in a first flight state, where the first flight state may represent a steady flight state or a take-off preparing state of the UAV; determining a flight hazard level of the UAV based on the meteorological data obtained, where the flight hazard level may represent a hazard level caused to a flight of the UAV by weather; and controlling the UAV to switch to a second flight state when the flight hazard level is a first preset level, where the first preset level may represent a level where the UAV cannot fly safely and the second flight state may represent an emergency flight state or a take-off suspended state of the UAV.

According to a second aspect of the present disclosure, there is provided a device for controlling a UAV. The device may include: an obtaining module configured to obtain meteorological data in a current location of the UAV when the UAV is in a first flight state, where the first flight state may represent a steady flight state or a take-off preparing state of the UAV; a determining module configured to determine a flight hazard level of the UAV based on the meteorological data obtained by the obtaining module, where the flight hazard level may represent a hazard level caused to a flight of the UAV by weather; and a switching module configured to control the UAV to switch to a second flight state when the determining module determines the flight hazard level as a first preset level, where the first preset level may represent a level where the UAV cannot fly safely and the second flight state may represent an emergency flight state or a take-off suspended state of the UAV.

According to a third aspect of embodiments of the present disclosure, there is provided a device for controlling a UAV. The device includes: a processor, and a memory configured to store an instruction executable by the processor, where the processor is configured to: obtain meteorological data in a current location of the UAV when the UAV is in a first flight state, where the first flight state may represent a steady flight state or a take-off preparing state of the UAV; determine a flight hazard level of the UAV based on the meteorological data obtained, where the flight hazard level may represent a hazard level caused to a flight of the UAV by weather; and control the UAV to switch to a second flight state when the flight hazard level is a first preset level, where the first preset level may represent a level where the UAV cannot fly safely and the second flight state may represent an emergency flight state or a take-off suspended state of the UAV.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings, where the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1A:
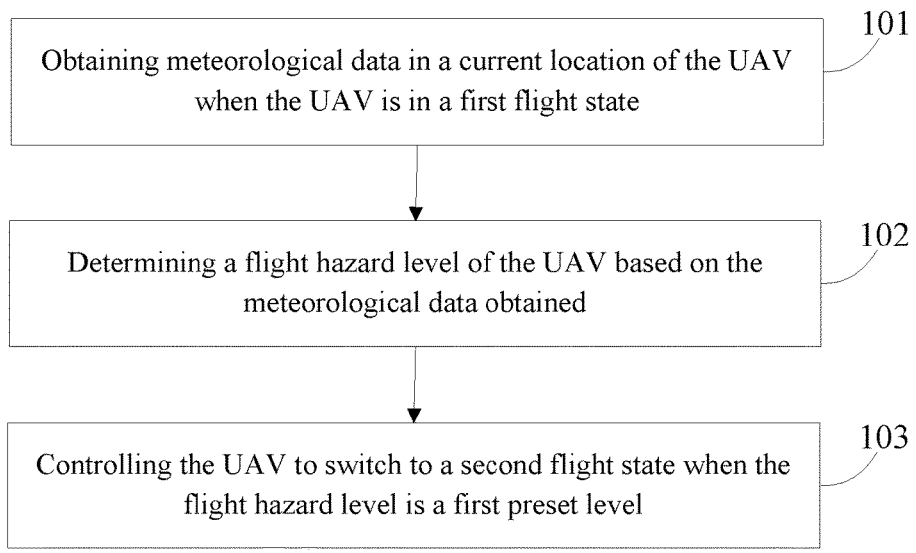
FIG. 1A is a flow chart of a method for controlling an unmanned aerial vehicle according to an example embodiment.
Figure 1B:
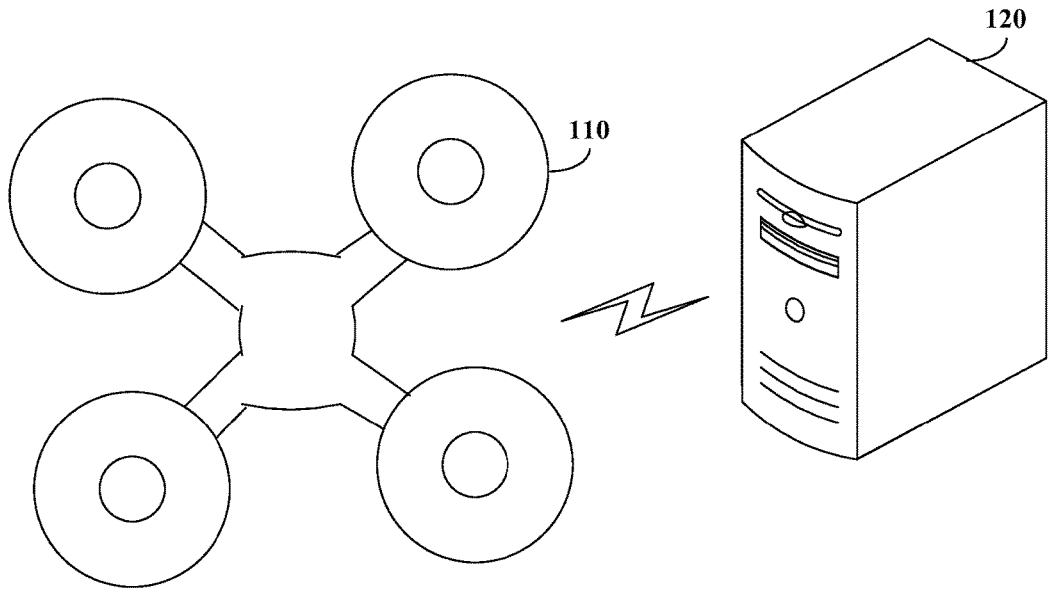
FIG. 1B illustrates a scenario for implementing a method for controlling an unmanned aerial vehicle according to an example embodiment.
Figure 1C:
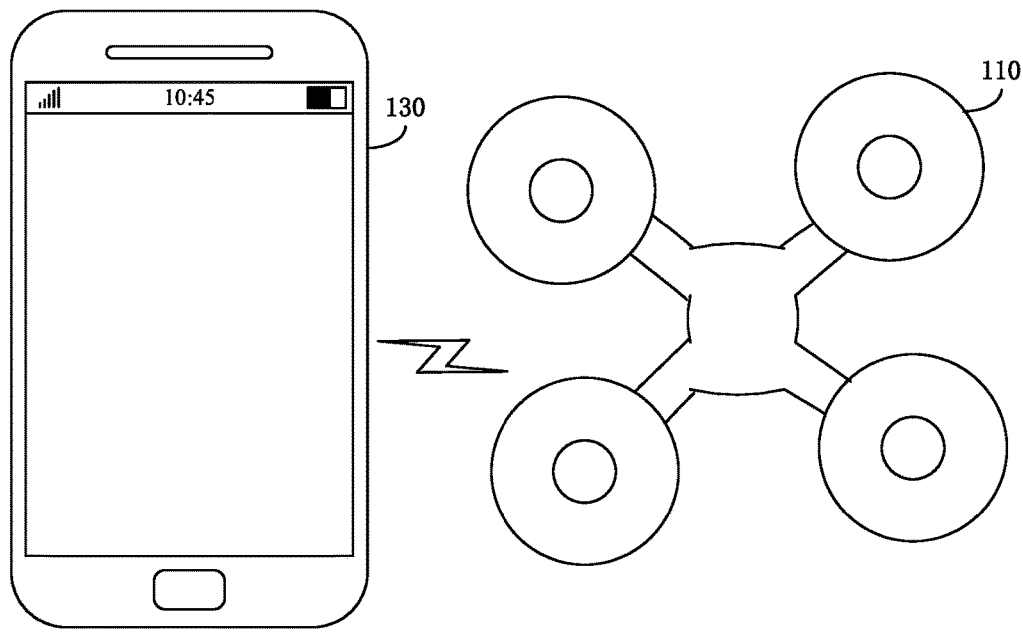
FIG. 1C illustrates a scenario for implementing a method for controlling an unmanned aerial vehicle according to an example embodiment.

FIG. 1A is a flow chart of a method for controlling an unmanned aerial vehicle according to an example embodiment; FIG. 1B illustrates a scenario for implementing a method for controlling an unmanned aerial vehicle according to an example embodiment; FIG. 1C illustrates a scenario for implementing a method for controlling an unmanned aerial vehicle according to an example embodiment. The method may be applied to the unmanned aerial vehicle, and as shown in FIG. 1A, the method includes the following steps.

In step 101, meteorological data in a current location of the UAV is obtained when the UAV is in a first flight state.

In this disclosure, the first flight state may represent a steady flight state or a take-off preparing state of the UAV. Here, the steady flight state or the take-off preparing state of the UAV may represent a state, in which the UAV flies according to a predetermined flight mission plan.

In one or more embodiments, the UAV may obtain the meteorological data by accessing one or more online database. The meteorological data may include temperature, air pressure, relative humidity, water vapor pressure, wind power, rainfall, visibility and sandstorms or the like. Alternatively or additionally, the UAV may analyze real time pictures to obtain local meteorological data. For example, the UAV may analyze the pictures to obtain the visibility and sandstorms. The UAV may also use one or more sensors to detect the meteorological data in the local area. The one or more sensors may include at least one of the following: a temperature sensor, a pressure sensor, a humidity sensor, a motion sensor, a vision sensor, etc.

Further, the meteorological data may include local meteorological data and meteorological data on the planned trip in the flight mission plan. When there are multiple UAVs flying in a region, the UAVs may communicate with each other to inform about the local meteorological data of each UAV. The UAVs may either communicate directly or communicate via a remote server so that the UAVs can share the meteorological data with each other.

In step 102, a flight hazard level of the UAV is determined based on the meteorological data obtained.

In this disclosure, the flight hazard level may represent a hazard level caused to a flight of the UAV by weather. The UAV may preset a plurality of hazard levels caused to the flight of the UAV by different weather conditions.

In one or more embodiments, the UAV may compute a meteorological hazard index based on the meteorological data obtained, and determine the flight hazard level based on the meteorological hazard index. For example, the UAV may determine the meteorological hazard index based on the strength of the wind power, where the stronger the wind power is, the greater the corresponding meteorological hazard index is. The UAV may determine the visibility based on the density of PM 2.5, where a lower the visibility generally corresponds to a greater meteorological hazard index. The UAV may further determine the meteorological hazard index based on the amount of the rainfall, where the lager the rainfall is, the greater the corresponding meteorological hazard index is.

In one or more embodiments, to the UAV may compute the meteorological hazard index by taking various items of meteorological data into consideration. For example, the hazard index for each item of data may have a preset number (N) of grades, where the preset number N may be a number greater or equal than 1. When the preset number N is 10, the hazard index for each item of data has ten grades from 0 to 9; the hazard index for each item of data may be computed first, and a sum value of all the hazard indexes is computed to obtain the meteorological hazard index. For example, when the temperature is 20 degrees below zero, the hazard index corresponding to the temperature is 9; when the wind scale is 7, the hazard index corresponding to the wind power is 8; when the visibility is 1000 meters, the hazard index corresponding to the visibility is 8; other corresponding hazard indexes may be computed based on the rainfall and the sandstorms; finally the meteorological hazard index corresponding to the meteorological data is obtained.

In this disclosure, the flight hazard level corresponding to the meteorological hazard index may be determined by inquiring into a preset list.

Additionally or alternatively, the UAV may determine the flight hazard level by judging or determining whether the meteorological hazard index is greater than a first preset threshold, which realizes flexible determination of the flight hazard level.

In an embodiment, the flight hazard level may be divided into two levels, namely a level suitable for flight and a level unsuitable for flight. In another embodiment, the flight hazard level may be divided in other manners, which will not be limited in the present disclosure. The flight hazard level may include additional levels if needed.

In step 103, the UAV is controlled to switch to a second flight state when the flight hazard level is a first preset level.

In an embodiment, the first preset level may represent a level where the UAV cannot fly safely.

In an embodiment, when the first flight state is the steady flight state, the second flight state may represent an emergency flight state of the UAV; in another embodiment, when the first flight state is the take-off preparing state, the second flight state may represent a take-off suspended state of the UAV.

In an example scenario, as shown in FIG. 1B, a UAV 110 may obtain the meteorological data according to a certain frequency during the steady flight. When the meteorological data is needed, a current location of the UAV 110 may be located via GPS, and then the meteorological data in the current location is obtained by accessing a network server 120. The UAV may compute the meteorological hazard index based on the meteorological data, and determine the flight hazard level based on the meteorological hazard index. When the flight hazard level is determined as the first preset level, the UAV is controlled to switch flight states. For example, the UAV may switch from an active flight state, in which the UAV flies according to the flight mission plan, to a return flight state, an emergency-landing state, or the take-off suspended state.

In an example scenario, as shown in FIG. 1C, the UAV 110 may receive the meteorological data sent by a user terminal 130 during the steady flight. The UAV 110 may compute the meteorological hazard index based on the meteorological data, and determine the flight hazard level based on the meteorological hazard index. When the flight hazard level is determined as the first preset level, the UAV is controlled to switch flight states. For example, the UAV may switch from the active flight state, in which the UAV flies according to the flight mission plan to a return flight state, an emergency-landing state, or the take-off suspended state.

In one or more embodiments, during the steady flight, the UAV may obtain the current meteorological data, such as wind power, temperature, air pressure, thunderstorms and severe convection weather, and determine the current flight hazard level of the UAV based on the meteorological data; when the flight hazard level is the first preset level, the UAV is controlled to switch to the second flight state, such as a return flight state or an emergency-landing state. Since the UAV in the present disclosure may obtain real-time meteorological data automatically and deal with emergencies, thereby avoiding physical damages caused by dangerous weather. Moreover, the UAV has an increased degree of autonomous control to some extent because it does not need manual operations.

In one or more embodiments, the step of determining the flight hazard level of the UAV based on the meteorological data obtained may include: computing a meteorological hazard index in the current location of the UAV based on the meteorological data; and determining the flight hazard level corresponding to the meteorological hazard index by inquiring into a preset list, where the preset list may record the flight hazard level and the meteorological hazard index corresponding to the flight hazard level.

Here, the step of determining the flight hazard level of the UAV based on the meteorological data obtained may include: computing a meteorological hazard index in the current location of the UAV based on the meteorological data; judging or determining whether the meteorological hazard index is greater than a first preset threshold; determining the flight hazard level as the first preset level when the meteorological hazard index is greater than the first preset threshold; and determining the flight hazard level as a second preset level when the meteorological hazard index is smaller than or equal to the first preset threshold.

In one or more embodiments, the method may further include: controlling the UAV to work in the first flight state when the flight hazard level is determined as the second preset level, where the second preset level may represent a level where the UAV can fly safely.

In an embodiment, the step of obtaining the meteorological data in the current location of the UAV may include: locating the current location of the UAV via a GPS; and accessing a network server to obtain the meteorological data in the current location and within a predetermined surrounding area.

In an embodiment, the step of obtaining the meteorological data in the current location of the UAV may include: receiving a meteorological indication message sent by a user terminal; and analyzing the meteorological indication message to obtain the meteorological data in the current location of the UAV.

In an embodiment, the step of controlling the UAV to switch to the second flight state may include: determining a target location when the UAV works in the second flight state; determining a flight path of the UAV based on the current location and the target location; and controlling the UAV to fly according to the flight path.

In the following, technical solutions of the present disclosure will be illustrated in specific embodiments.

Figure 2:
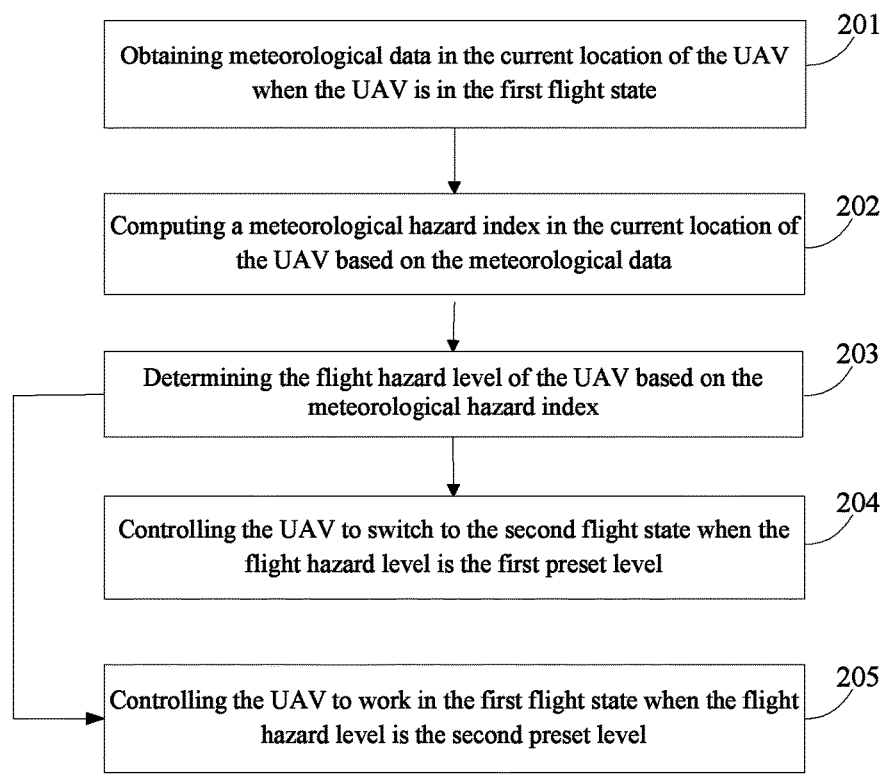
FIG. 2 is a flow chart of a method for controlling an unmanned aerial vehicle according to one or more embodiments.

FIG. 2 is a flow chart of a method for controlling an unmanned aerial vehicle according to one or more embodiments. This embodiment employs the above method of the present disclosure, and exemplifies, in combination with FIG. 1B, that the UAV switches its flight state based on the weather condition in the current location. As shown in FIG. 2, the method may include at least the following steps.

In step 201, meteorological data in a current location of the UAV is obtained when the UAV is in a first flight state.

In an embodiment, the first flight state may represent a steady flight state or a take-off preparing state of the UAV.

In an embodiment, the meteorological data in the current location of the UAV may be obtained in the following two ways.

First way: the current location of the UAV is located via GPS; and the network server is accessed to obtain the meteorological data in the current location and within the predetermined surrounding area.

As shown in FIG. 1B, the UAV 110 may obtain the meteorological data according to a certain frequency during the steady flight; when the meteorological data is needed, the current location of the UAV 110 may be located via GPS, and then the meteorological data in the current location is obtained by accessing the network server 120.

In an embodiment, the predetermined surrounding area may refer to a range extending from the current location of the UAV by a predetermined distance in a flight direction. The predetermined distance may be preset by a user. For example, the predetermined distance may be preset between 0.5 Km and 100 Km, and preferably between 2 km and 50 km, or more preferably between 5 km and 10 km. Here, the lower limit and upper limit may also be adjusted by the user using the user terminal.

Second way: the meteorological indication message sent by the user terminal is received; and the meteorological indication message is analyzed to obtain the meteorological data in the current location of the UAV.

As shown in FIG. 1C, the UAV 110 may receive the meteorological indication message sent by the user terminal 130 during the steady flight, and analyze the meteorological indication message to obtain the meteorological data in the current location of the UAV.

In step 202, the meteorological hazard index in the current location of the UAV is computed based on the meteorological data.

Detailed description of step 202 may refer to description of step 102 in the embodiment of FIG. 1A, which will not be elaborated.

In step 203, the flight hazard level of the UAV is determined based on the meteorological hazard index.

In an embodiment, the flight hazard level may represent the hazard level caused to a flight of the UAV by weather.

In an embodiment, the flight hazard level corresponding to the meteorological hazard index may be determined by inquiring into the preset list.

In an embodiment, the preset list may record the plurality of flight hazard levels and the meteorological hazard indices corresponding to the plurality of flight hazard levels. Here, one single flight hazard level may correspond to a range of the meteorological hazard indices.

In an embodiment, it is also possible to determine the flight hazard level by judging or determining whether the meteorological hazard index is greater than the first preset threshold. When the meteorological hazard index is greater than the first preset threshold, the flight hazard level is determined as the first preset level; when the meteorological hazard index is smaller than or equal to the first preset threshold, the flight hazard level is determined as the second preset level. More preset thresholds may be used when more than two hazard levels are set.

In an embodiment, the first preset threshold may be obtained through massive actual statistical data of the UAV from drone providers, and stored in the UAV. In a preset time period before using the UAV, the user may update the first preset threshold with actual flight data, such that the first preset threshold may distinguish the flight hazard levels corresponding to the meteorological hazard indexes better.

In step 204, the UAV is controlled to switch to the second flight state when the flight hazard level is the first preset level.

In an embodiment, the first preset level may represent the level where the UAV cannot fly safely, and the second flight state may represent the emergency flight state or the take-off suspended state of the UAV.

In step 205, the UAV is controlled to work in the first flight state when the flight hazard level is the second preset level.

In an embodiment, the second preset level may represent the level where the UAV can fly safely.

In this embodiment, for the determination of the flight hazard level, to the UAV may determine the flight hazard level corresponding to the meteorological hazard index by inquiring into the preset list. Alternatively or additionally, the UAV may determine the flight hazard level by judging or determining whether the meteorological hazard index is greater than the first preset threshold, which realizes flexible determination of the flight hazard level. For the acquisition of the meteorological data in the present disclosure, the meteorological data in the current location may be obtained by locating the current location via GPS and accessing the network server, which realizes automatic determination of the meteorological data in a current location of the UAV, without human input, thus improving user experience. Moreover, the meteorological data in the current location may be obtained based on the meteorological indication message sent by the user terminal, such that the user may send the meteorological data to the UAV timely when the user finds out weather changes in the current location of the UAV, to further avoid the physical damages to the UAV caused by dangerous weather and improve the user experience.

Figure 3:
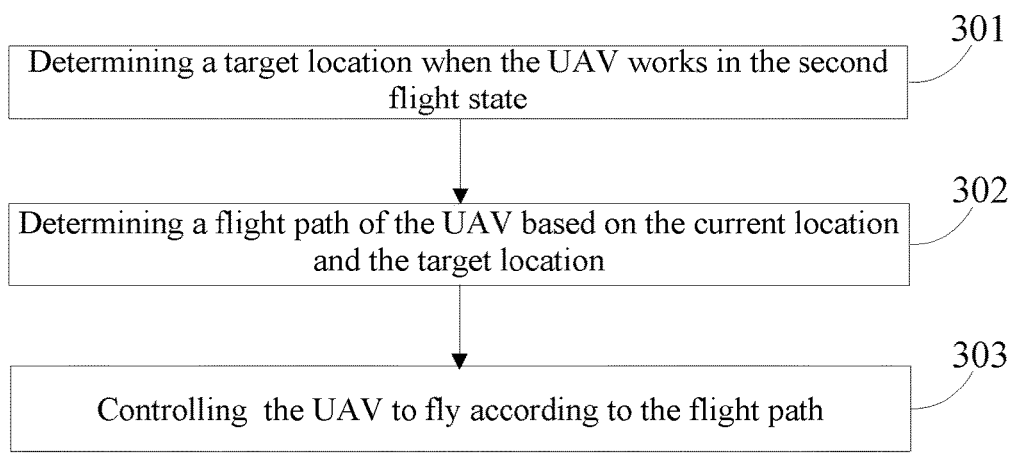
FIG. 3 is a flow chart of a method for controlling an unmanned aerial vehicle according to one or more embodiments.

FIG. 3 is a flow chart of a method for controlling an unmanned aerial vehicle according to one or more embodiments. This embodiment may employ the above method of the present disclosure, and exemplifies that the UAV switches its steady flight state to the second flight state. As shown in FIG. 3, the method may include at least the following steps.

In step 301, the target location is determined when the UAV works in the second flight state.

In an embodiment, when the UAV is in the steady flight state, the UAV may determine to return or land based on the current location and the meteorological data. For example, when an airport near the UAV has bad weather or parking aprons in the nearby airport are too limited to land even though the weather there is good, and the weather in a return direction is good and the UAV is relatively close to an airport where the UAV takes off, the UAV may choose to return, and a target airport for returning may be determined as the target location when the UAV works in the second flight state; when the airport near the UAV has good weather and enough parking aprons for the UAV to land, the airport near the UAV may be determined as the target location when the UAV works in the second flight state.

In an embodiment, when the UAV is in the take-off preparing state, the UAV may switch to the take-off suspended state and be controlled to park aside.

In step 302, the flight path of the UAV is determined based on the current location and the target location.

In an embodiment, when the UAV stores flight paths to various airports, the UAV may obtain the flight path based on the current location and the target location; when the UAV does not store flight paths to various airports, the UAV may send a request message to a remote control device to ask the remote control device to designate a flight path based on the current location and the target location.

In step 303, the UAV is controlled to fly according to the flight path.

In this embodiment, when the UAV needs to switch to the second flight state, the UAV may determine the flight path based on the current location and the target location to realize the switch from the first flight state to the second flight state, thus avoiding the physical damages to the UAV caused by dangerous weather and improving the user experience.

Figure 4:
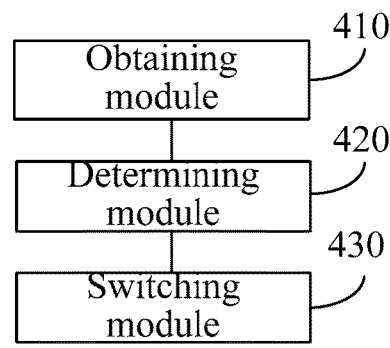
FIG. 4 is a block diagram of a device for controlling an unmanned aerial vehicle according to an example embodiment.

FIG. 4 is a block diagram of a device for controlling an unmanned aerial vehicle according to an example embodiment.

The device may be applied to the UAV and include: an obtaining module 410 configured to obtain meteorological data in a current location of the UAV when the UAV is in a first flight state, where the first flight state may represent a steady flight state or a take-off preparing state of the UAV; a determining module 420 configured to determine a flight hazard level of the UAV based on the meteorological data obtained by the obtaining module 410, where the flight hazard level may represent a hazard level caused to a flight of the UAV by weather; and a switching module 430 configured to control the UAV to switch to a second flight state when the determining module 420 determines the flight hazard level as a first preset level, where the first preset level may represent a level where the UAV cannot fly safely and the second flight state may represent an emergency flight state or a take-off suspended state of the UAV.

Figure 5:
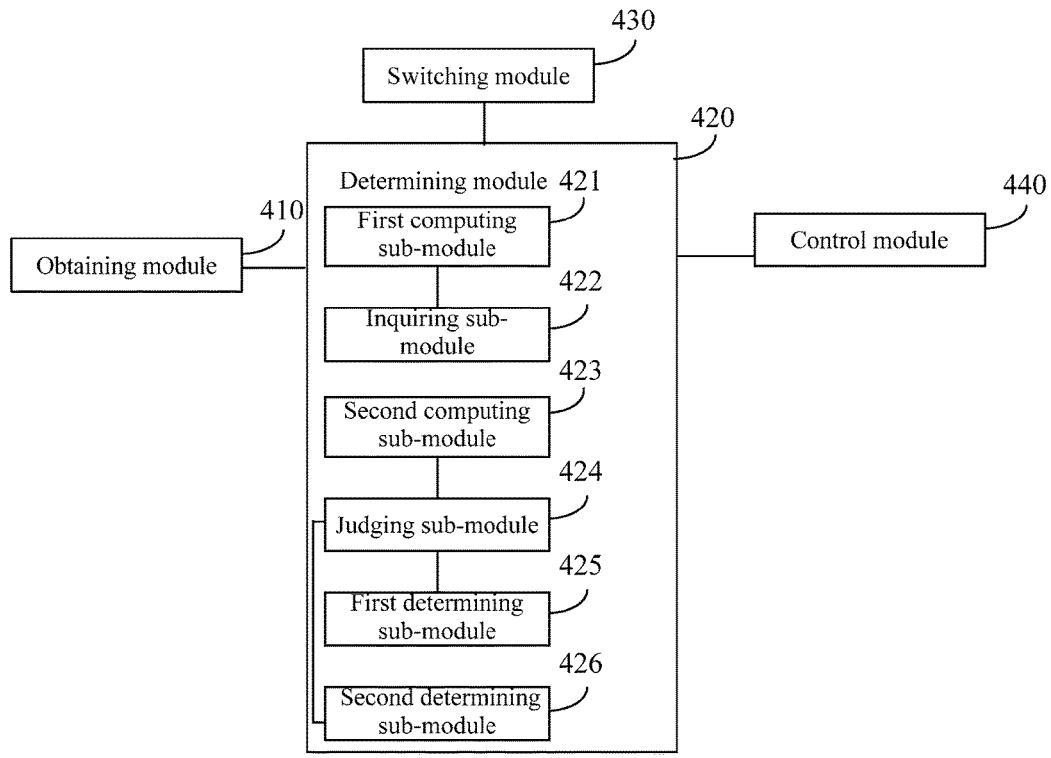
FIG. 5 is a block diagram of another device for controlling an unmanned aerial vehicle according to an example embodiment.

FIG. 5 is a block diagram of another device for controlling an unmanned aerial vehicle according to an example embodiment. Based on the embodiment of FIG. 4, in an embodiment, the determining module 420 includes: a first computing sub-module 421 configured to compute a meteorological hazard index in the current location of the UAV based on the meteorological data obtained by the obtaining module; and an inquiring sub-module 422 configured to inquire into a preset list to determine the flight hazard level corresponding to the meteorological hazard index computed by the first computing sub-module 421, where the preset list may record the flight hazard level and the meteorological hazard index corresponding to the flight hazard level.

In an embodiment, the determining module 420 includes: a second computing sub-module 423 configured to compute a meteorological hazard index in the current location of the UAV based on the meteorological data; a judging sub-module 424 configured to judge whether the meteorological hazard index computed by the second computing sub-module 423 is greater than a first preset threshold; a first determining sub-module 425 configured to determine the flight hazard level as the first preset level when the judging sub-module 424 judges that the meteorological hazard index is greater than the first preset threshold; and a second determining sub-module 426 configured to determine the flight hazard level as a second preset level when the judging sub-module 424 judges that the meteorological hazard index is smaller than or equal to the first preset threshold.

In an embodiment, the device further includes: a control module 440 configured to control the UAV to work in the steady flight state or the take-off preparing state when the determining module 420 determines the flight hazard level as the second preset level, where the second preset level may represent a level where the UAV can fly safely.

Figure 6:
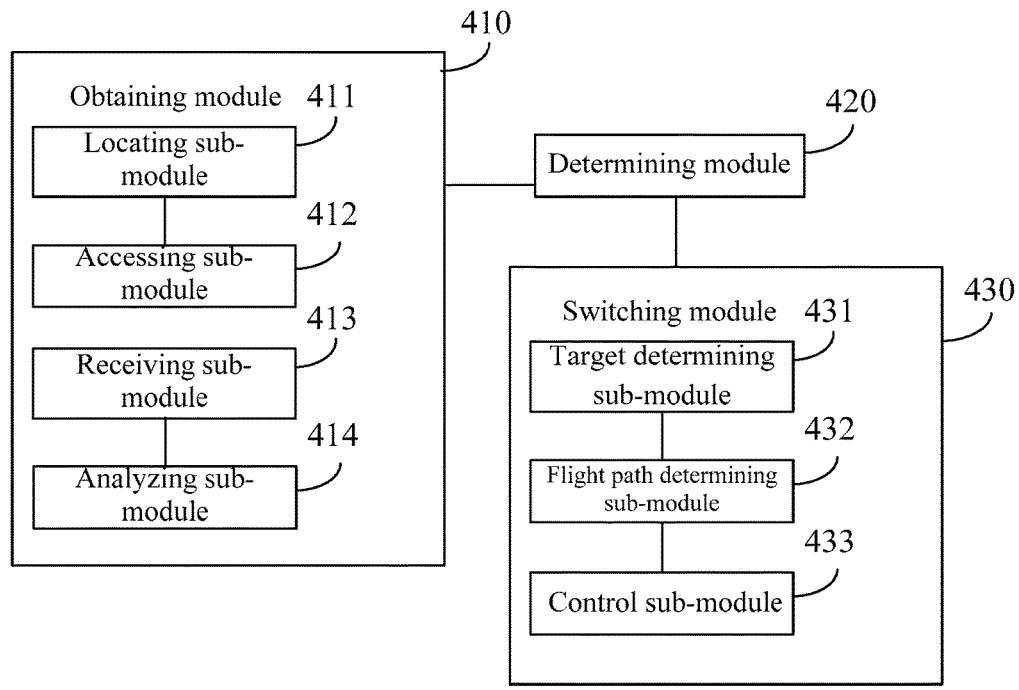
FIG. 6 is a block diagram of still another device for controlling an unmanned aerial vehicle according to an example embodiment.

FIG. 6 is a block diagram of still another device for controlling an unmanned aerial vehicle according to an example embodiment. Based on the embodiment of FIG. 4 and/or the embodiment of FIG. 5, in an embodiment, the obtaining module 410 includes: a locating sub-module 411 configured to locate the current location of the UAV via a GPS; and an accessing sub-module 412 configured to access a network server to obtain the meteorological data in the current location located by the locating sub-module 411 and within a predetermined surrounding area.

In an embodiment, the obtaining module 410 includes: a receiving sub-module 413 configured to receive a meteorological indication message sent by a user terminal; and an analyzing sub-module 414 configured to analyze the meteorological indication message received by the receiving sub-module to obtain the meteorological data in the current location of the UAV.

In an embodiment, the switching module 430 includes: a target determining sub-module 431 configured to determine a target location when the UAV works in the second flight state; a flight path determining sub-module 432 configured to determine a flight path of the UAV based on the current location and the target location determined by the target determining sub-module 431; and a control sub-module 433 configured to control the UAV to fly according to the flight path determined by the flight path determining sub-module 432.

With respect to the devices in the above embodiments, the specific manners for performing operations for individual modules therein have been described in detail in the embodiments regarding the methods for controlling unmanned aerial vehicles, which will not be elaborated herein.

The device embodiment is substantially corresponding to the method embodiment, so relevant part of illustration of the method embodiment may be referred to. The device embodiment described above is only exemplary, where the units described as separate components may be or may not be physically separate; the component as the displaying unit may be or not be a physical unit, i.e. may be located at a position or be distributed at many network elements. It is possible to select part of or all of the modules to realize the objective of the present disclosure, which may be understood and implemented by those skilled in the art without paying more creative effort.

Figure 7:
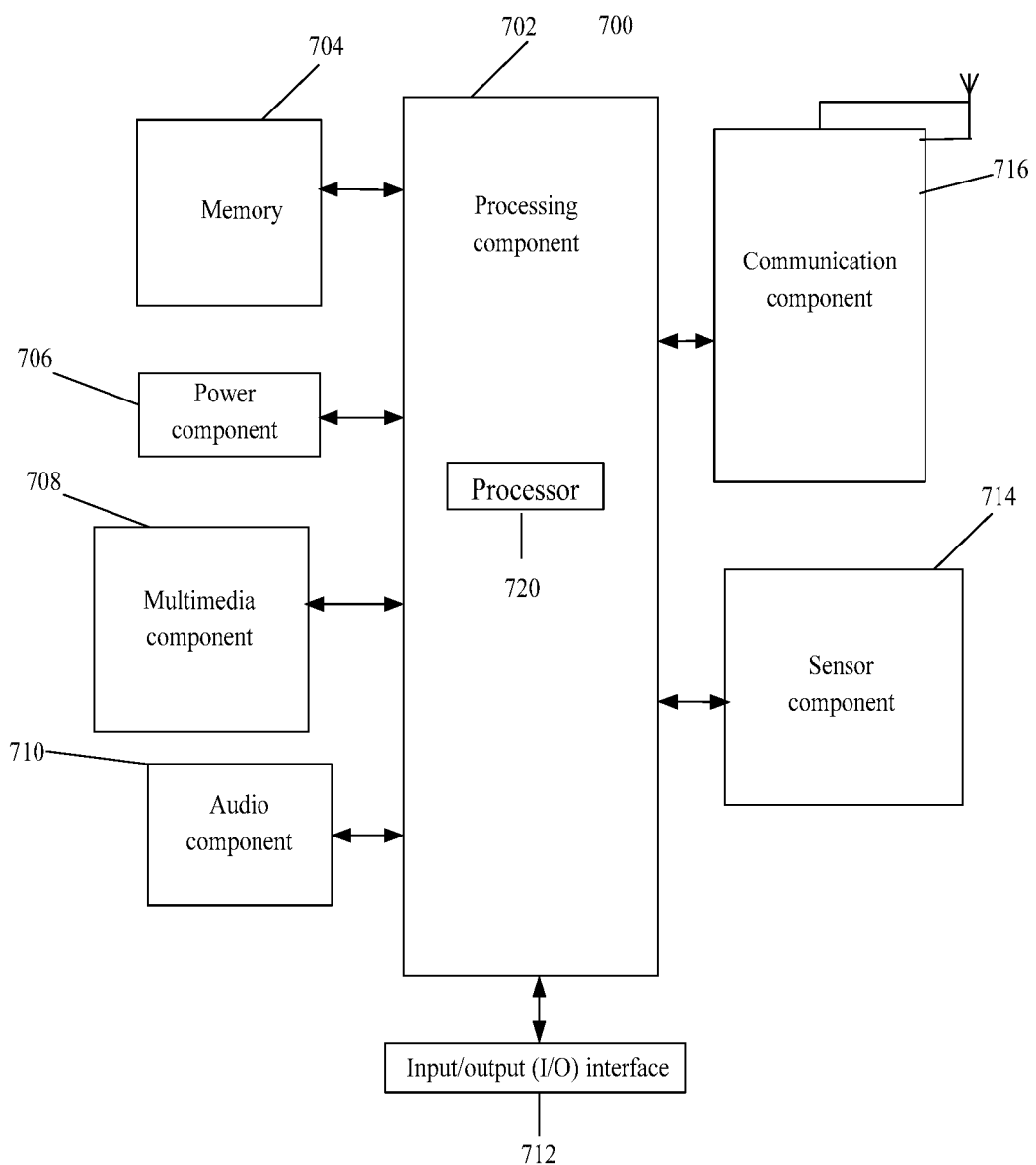
FIG. 7 is a block diagram of a device suitable for controlling an unmanned aerial vehicle according to an example embodiment.

FIG. 7 is a block diagram suitable for a device for controlling an unmanned aerial vehicle according to an example embodiment. For example, the device 700 may be a UAV.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 707 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G; or 3G; or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The device 700 may use the circuitries in combination with the other hardware or software components for performing the above described methods. Each module, sub-module, unit, or sub-unit disclosed above in FIG. 4-6 may be implemented at least partially using the one or more circuitries.

In example embodiments, there is also provided a non-transitory computer-readable storage medium including instructions, such as included in the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be apparent to those skilled in the art from consideration of the specification and practice of the disclosure disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method of controlling an unmanned aerial vehicle (UAV), comprising:
    obtaining meteorological data in a current location of the UAV when the UAV is in a first flight state, wherein the first flight state represents one of a steady flight state and a take-off preparing state of the UAV;
    determining a flight hazard level of the UAV based on the meteorological data, wherein the flight hazard level represents a hazard level caused to a flight of the UAV by weather; and
    controlling the UAV to switch to a second flight state when the flight hazard level is a first preset level, wherein the first preset level represents a level where the UAV cannot fly safely and the second flight state represents one of an emergency flight state and a take-off suspended state of the UAV,
    wherein determining the flight hazard level of the UAV based on the meteorological data comprises:
    computing a meteorological hazard index in the current location of the UAV based on the meteorological data;
    determining whether the meteorological hazard index is greater than a first preset threshold;
    determining the flight hazard level as the first preset level when the meteorological hazard index is greater than the first preset threshold; and
    determining the flight hazard level as a second preset level when the meteorological hazard index is smaller than or equal to the first preset threshold, and wherein the second preset level represents a level where the UAV can fly safely.

2. The method according to claim 1, wherein determining the flight hazard level of the UAV based on the meteorological data comprises:
    computing the meteorological hazard index in the current location of the UAV based on the meteorological data; and
    determining the flight hazard level corresponding to the meteorological hazard index by inquiring into a preset list, wherein the preset list records the flight hazard level and the meteorological hazard index corresponding to the flight hazard level.

3. The method according to claim 1, further comprising:
controlling the UAV to work in the steady flight state or the take-off preparing state when the flight hazard level is determined as a second preset level.

4. The method according to claim 1, wherein obtaining meteorological data in the current location of the UAV comprises:
locating the current location of the UAV via a GPS; and
accessing a network server to obtain the meteorological data in the current location and within a predetermined surrounding area.

5. The method according to claim 1, wherein obtaining meteorological data in the current location of the UAV comprises:
receiving a meteorological indication message sent by a user terminal; and
analyzing the meteorological indication message to obtain the meteorological data in the current location of the UAV.

6. The method according to claim 1, wherein controlling the UAV to switch to the second flight state comprises:
determining a target location when the UAV works in the second flight state;
determining a flight path of the UAV based on the current location and the target location; and
controlling the UAV to fly according to the flight path.

7. A device of controlling an unmanned aerial vehicle (UAV), comprising:
a processor;
a memory configured to store an instruction executable by the processor;
wherein the processor is configured to:
obtain meteorological data in a current location of the UAV when the UAV is in a first flight state, wherein the first flight state represents a steady flight state or a take-off preparing state of the UAV;
determine a flight hazard level of the UAV based on the meteorological data, wherein the flight hazard level represents a hazard level caused to a flight of the UAV by weather; and
control the UAV to switch to a second flight state when the flight hazard level is a first preset level, wherein the first preset level represents a level where the UAV cannot fly safely and the second flight state represents an emergency flight state or a take-off suspended state of the UAV,
wherein the processor is configured to determine the flight hazard level of the UAV based on the meteorological data, by acts of:
computing a meteorological hazard index in the current location of the UAV based on the meteorological data;
determining whether the meteorological hazard index is greater than a first preset threshold;
determining the flight hazard level as the first preset level when the meteorological hazard index is greater than the first preset threshold; and
determining the flight hazard level as a second preset level when the meteorological hazard index is smaller than or equal to the first preset threshold, and wherein the second preset level represents a level where the UAV can fly safely.

8. The device according to claim 7, wherein the processor is configured to determine the flight hazard level of the UAV based on the meteorological data, by acts of:
computing the meteorological hazard index in the current location of the UAV based on the meteorological data; and
determining the flight hazard level corresponding to the meteorological hazard index by inquiring into a preset list, wherein the preset list records the flight hazard level and the meteorological hazard index corresponding to the flight hazard level.

9. The device according to claim 7, wherein the processor is further configured to:
control the UAV to work in the steady flight state or the take-off preparing state when the flight hazard level is determined as a second preset level.

10. The device according to claim 7, wherein the processor is configured to obtain meteorological data in the current location of the UAV, by acts of:
locating the current location of the UAV via a GPS; and
accessing a network server to obtain the meteorological data in the current location and within a predetermined surrounding area.

11. The device according to claim 7, wherein the processor is configured to obtain meteorological data in the current location of the UAV, by acts of:
receiving a meteorological indication message sent by a user terminal; and
analyzing the meteorological indication message to obtain the meteorological data in the current location of the UAV.

12. The device according to claim 7, wherein the processor is configured to control the UAV to switch to the second flight state, by acts of:
determining a target location when the UAV works in the second flight state;
determining a flight path of the UAV based on the current location and the target location; and
controlling the UAV to fly according to the flight path.

13. A non-transitory computer-readable storage medium having stored therein instructions that, when executed by a processor of a terminal, causes the terminal to perform a method for controlling an unmanned aerial vehicle (UAV), the method comprising:
obtaining meteorological data in a current location of the UAV when the UAV is in a first flight state, wherein the first flight state represents a steady flight state or a take-off preparing state of the UAV;
determining a flight hazard level of the UAV based on the meteorological data, wherein the flight hazard level represents a hazard level caused to a flight of the UAV by weather; and
controlling the UAV to switch to a second flight state when the flight hazard level is a first preset level, wherein the first preset level represents a level where the UAV cannot fly safely and the second flight state represents an emergency flight state or a take-off suspended state of the UAV,
wherein determining the flight hazard level of the UAV based on the meteorological data comprises:
computing a meteorological hazard index in the current location of the UAV based on the meteorological data;
determining whether the meteorological hazard index is greater than a first preset threshold;
determining the flight hazard level as the first preset level when the meteorological hazard index is greater than the first preset threshold; and
determining the flight hazard level as a second preset level when the meteorological hazard index is smaller than or equal to the first preset threshold, and wherein the second preset level represents a level where the UAV can fly safely.

14. The non-transitory computer-readable storage medium according to claim 13, wherein determining the flight hazard level of the UAV based on the meteorological data comprises:
  computing a meteorological hazard index in the current location of the UAV based on the meteorological data; and
  determining the flight hazard level corresponding to the meteorological hazard index by inquiring into a preset list, wherein the preset list records the flight hazard level and the meteorological hazard index corresponding to the flight hazard level.

15. The non-transitory computer-readable storage medium according to claim 13, wherein the method further comprises:
  controlling the UAV to work in the steady flight state or the take-off preparing state when the flight hazard level is determined as a second preset level.

16. The non-transitory computer-readable storage medium according to claim 13, wherein obtaining meteorological data in the current location of the UAV comprises:
  locating the current location of the UAV via a GPS; and
  accessing a network server to obtain the meteorological data in the current location and within a predetermined surrounding area.

17. The non-transitory computer-readable storage medium according to claim 13, wherein obtaining meteorological data in the current location of the UAV comprises:
  receiving a meteorological indication message sent by a user terminal; and
  analyzing the meteorological indication message to obtain the meteorological data in the current location of the UAV.

* * * * *